United States Patent

[11] 3,599,543

[72] Inventor Norman Edward Kerridge
Salford near Bristol, Somerset, England
[21] Appl. No. 800,213
[22] Filed Feb. 18, 1969
[45] Patented Aug. 17, 1971
[73] Assignee Stothert & Pitt Limited
Bath, Somerset, England
[32] Priority Dec. 2, 1964, Feb. 10, 1965
[33] Great Britain
[31] 49001/68 and 5769/68
Continuation-in-part of application Ser. No. 718,638, Apr. 3, 1968, now abandoned, which is a continuation-in-part of application Ser. No. 509,856, Nov. 26, 1965, now abandoned.

[54] VIBRATORY MACHINES
11 Claims, 9 Drawing Figs.

[52] U.S. Cl. .......................................................... 94/50
[51] Int. Cl. ....................................................... E01c 19/28
[50] Field of Search ............................................ 94/50, 48

[56] References Cited
UNITED STATES PATENTS
3,053,157  9/1962  Martin ........................... 94/50

*Primary Examiner*—Jacob L. Nackenoff
*Attorney*—Baldwin, Wight and Brown

ABSTRACT: In a vibratory machine having a member which is vibrationally excited by a force of substantially constant amplitude and frequency, and which is placed against the surface of material to be compacted, the degree of compaction achieved is measured by producing a signal proportional to the magnitude of the maximum instantaneous amplitude of the vibratory movement of the vibratory member due to its excitation and the effects of the material, the signal being passed to a display unit and/or used to control an operating parameter of the machine. The machine may be a vibratory roller, the roll of which is the vibrated member. Preferably one or more acceleration transducers are mounted on the vibratory member, and their outputs are integrated twice against time to provide a signal proportional to the instantaneous amplitude of vibration on the operative axis of the transducer or transducers. Two transducers may be placed at right angles and their signals combined, or an appropriate number of transducers may be placed on different axes so that one at least will always have an integrated output closely approximating to the maximum instantaneous amplitude, the correct signal, if more than one transducer is used, being chosen by selecting the largest integrated output for passage to a display unit.

FIG. I.

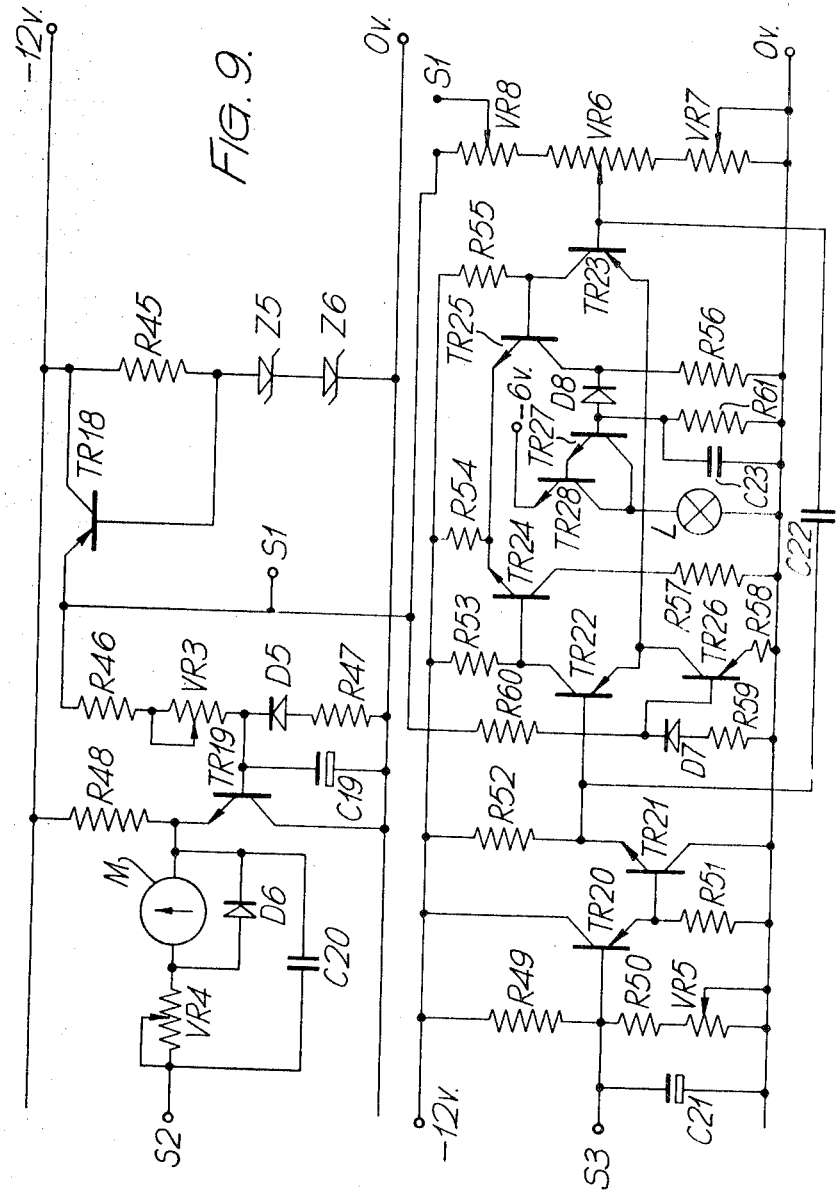

VIBRATORY MACHINES

This application is a continuation-in-part of my application Ser. No. 718,638, filed Apr. 3, 1968, which is a continuation-in-part of my application Ser. No. 509,856, filed Nov. 26, 1965, both now abandoned.

This invention relates to vibratory machines for carrying out compaction of soils, and in particular to means for measuring or indicating the degree of compaction achieved.

Vibrating rollers are typical examples of such machines, and the term 'soil' in this specification is taken to mean any bed of material of a nature capable of being compacted by a vibrating roller. The invention however is not limited to vibratory rollers, but is applicable to any vibratory compacting machine intended for application to the surface of such material. Materials unsuitable for compaction by machines according to the invention includes wet mix concretes and ground that holds so much water that it becomes fluid under the influence of mechanical working.

The degree of compaction of soil achieved by a roller or other vibratory machine is a function of the nature of the soil being compacted including its moisture or binder content on the one hand, and the characteristics of the vibration and the weight and the size of the roll on the other hand. The nature of soil varies and it is possible to govern the degree of compaction by for example varying the duration of the vibration or by varying the speed of travel of the vibrating roller over the soil.

There is a need for vibratory rollers provided with means for indicating or measuring the degree of compaction achieved by the roller, the indications or measurements being used to enable the operator to alter the speed of motion of the machine over the soil during compaction or to determine when the required degree of compaction has been achieved; such machines, if self propelled, could additionally be provided with automatic means to control their speed over the soil responsive to said indications or measurements. It should be noted in this connection that overvibration can result in a lower degree of compaction in the soil.

A similar need exists for a means of accurately controlling or indicating the degree of compaction produced by a vibrating beam, or shoe which does not rotate, as does a roller, but merely vibrates, i.e. the vibrating beam on a concrete finishing machine (provided that the concrete mix is sufficiently dry that it does not become fluid during treatment). Such apparatus can either travel or be stationary but has in common with a roller that vibration is applied to the surface of the material to be vibrated.

Although with many vibratory machines it is possible for certain characteristics of the machine to be adjusted, and in most cases it is possible for the duration of the vibratory treatment to be varied, the sufficiency, consistency and efficiency of the treatment tends to depend on the skill of the operator and in many cases really satisfactory results are beyond the capabilities of even the most skilled operator.

The object of the invention is to improve the efficiency of operation of vibratory machines by indicating or measuring the degree of compaction of the material being compacted during operation of the machine, in order alternatively or in combination, to determine the duration of the operation or to assess its progress or to enable the speed of movement over the soil to be set to the best value, the control being related to the condition of the material being treated as measured or indicated rather than an operator's assessment of this condition. The degree of compaction is measured by comparing the length of the major axis of the elliptical path found to be followed (ignoring movements not due to vibration) by a point on the vibrated member with the length of said axis observed when the ground is fully compacted, whilst the frequency and amplitude of the exciting force applied to the vibrated member are maintained substantially constant, the frequency being selected so as at all times to be above the resonant frequency of the system comprised by the vibratory member and the material being compacted.

It has been proposed in U.S. Pat. No. 3,053,157 (Martin) to provide a vibratory roller with transducer means and associated indicating means whereby the vibration frequency applied may be adjusted to be in resonance with the roll/ground system during vibration. For this purpose, there is mounted on the roller frame a transducer sensitive to accelerative disturbances of the frame in a vertical direction, such disturbances being at a maximum when the roll/ground system is in resonance. This proposal should be clearly distinguished from the present invention, from which it differs in a number of respects.

Firstly, it is a prerequisite of the present invention that the frequency of vibrationary excitation of the roller remains substantially constant during the period over which compaction is to be indicated (whilst a roller to which the invention is applied may be equipped for more than one frequency of vibration, separate calibration of the indicating means will be required for each frequency). In the Martin construction on the other hand, it is a prerequisite that the frequency of vibration is varied during operation in order to maintain the system in resonance.

Secondly, whilst the frequency of resonance of the roll/ground system varies with the degree of compaction and is thus itself an indication of the degree of compaction, this is not a parameter which can be used in practice for compaction measurements. On the one hand, the frequency of resonance of most soils is not well defined and thus accurate measurements are impossible. On the other hand, the applicant regards it as undesirable to operate a vibrating roller at or very near resonance since with the amplitudes of vibration normal and desirable in a modern vibrating roller, the vibrated roll would bounce on the ground in a violent and uncontrollable manner so that often it would not be possible to steer the machine even when it is a trailer model and still less so when it is a tandem or single roll hand guided model. In addition to this, the natural frequency of vibration of the ground to be compacted and its damping characteristics vary so much that strength limitations would not permit construction of a roller which would be capable of achieving optimum compaction under all these conditions. MOreover, the degree of compaction achieved is not necessarily increased by increasing the amplitude of vibration since a point is reached when an increase in amplitude tends to break up rather than compact the soil. The amplitude of vibration of a roll in resonance often passes this point.

Thirdly, although the major axis of the elliptical path referred to above can occur on a vertical axis (which is the axis on which Martin takes his measurements), it more usually does not do so, and the relationship between the directional axis of said major axis and the vertical bears no predictable relationship to the degree of compaction. The instantaneous amplitude of vibration on a vertical axis is not therefore, except under fortuitous and unpredictable circumstances, proportional to the length of said major axis and hence the degree of compaction.

Fourthly, Martin detects acceleration of the roller frame rather than the roll itself, and since these components are in practice invariably linked by a flexible suspension, the movement of the frame will, as related to the roll, be modified by the suspension characteristics. Furthermore, Martin detects only accelerations, and does not carry out any integration in order to obtain a signal actually proportional to displacement.

Lastly, under conditions of resonance, the motion of the roll ceases to be strictly cyclical, and even if the roll frame were made heavy enough to maintain cyclical motion, the variation of the length of said major axis over a fairly wide range of frequencies in the region of resonance is very small, could not be accurately measured, and does not bear a simple relationship to the degree of compaction achieved.

It has also been proposed in German Pat. No. 822,979, which describes a vibratory compactor comprising a ground contacting body excited by contrarotating weights, to maintain the body in resonance with the ground by observing the phase angle between the exciting force and the resulting movement of the body and making use of the information obtained to adjust the working parameters of the machine. The phase angle is ascertained by plotting the exciting force on an oscilloscope against the output of a vibration detector mounted on the body so as to produce Lissajous figures. Since the relationship of the maximum amplitudes of the signals applied to the oscilloscope must be constant in order to obtain figures which are interpretable, variations in the maximum instantaneous amplitude of the signal picked up from the vibration detector are not shown, and in any event the operation of the machine at resonance precludes the obtaining of significant information from this characteristic even if its value were available. Finally, the signal picked up from the vibration detector will not be proportional to the maximum dimension of the path followed by a point on the vibrating member, although, and this is all that is important in the German patent, it will bear a predetermined phase relationship to it. In addition, many of the objections raised in respect of the Martin machine also apply with respect to the German patent machine.

The present invention is based on my discovery that, at frequencies of excitation above resonance, the maximum dimension of the path followed by a point on a vibrating member on contact with the ground in response to the exciting force applied thereto is directly related to the degree of compaction of the ground to which the machine is applied, assuming the amplitude and frequency of the exciting force to be constant and the frequency to be above the resonant frequency of the vibrating member/ground system, which is invariably the case with conventional vibratory machines. In the case of a vibratory roller, of which the roll is excited by an eccentrically rotating weight, the path followed by a point on the roll as a result of the vibration assumes the shape of an inclined ellipse when the roll is in contact with the ground, and although the inclination of this ellipse may vary for various reasons, the length of its major axis, subject to the conditions outlined above, is proportional to the degree of compaction of the ground.

A special object of the invention is thus to ascertain the maximum dimension of the path followed as a result of vibration by any point on the vibrating member of a vibratory machine and to utilize this to indicate the degree of compaction achieved or to control the machine.

Further objects of the invention will become apparent from the following description with reference to the accompanying drawings in which:

FIG. 1 shows the shapes of the paths followed by a point on the vibrated roll of a vibrating roller as a result of vibration, the circle A showing the shape obtained with the roll jacked off the ground, the ellipses B to F, the shapes at different points in a typical compaction operation, and the graph showing the ratio of the length of the major axes of ellipses B to F relative to the diameter of circle A, plotted against the amount of vibration applied to the ground.

FIG. 9 is a circuit diagram of a metering and indicating unit for use with the computer unit of FIG. 8.

Figure 1:
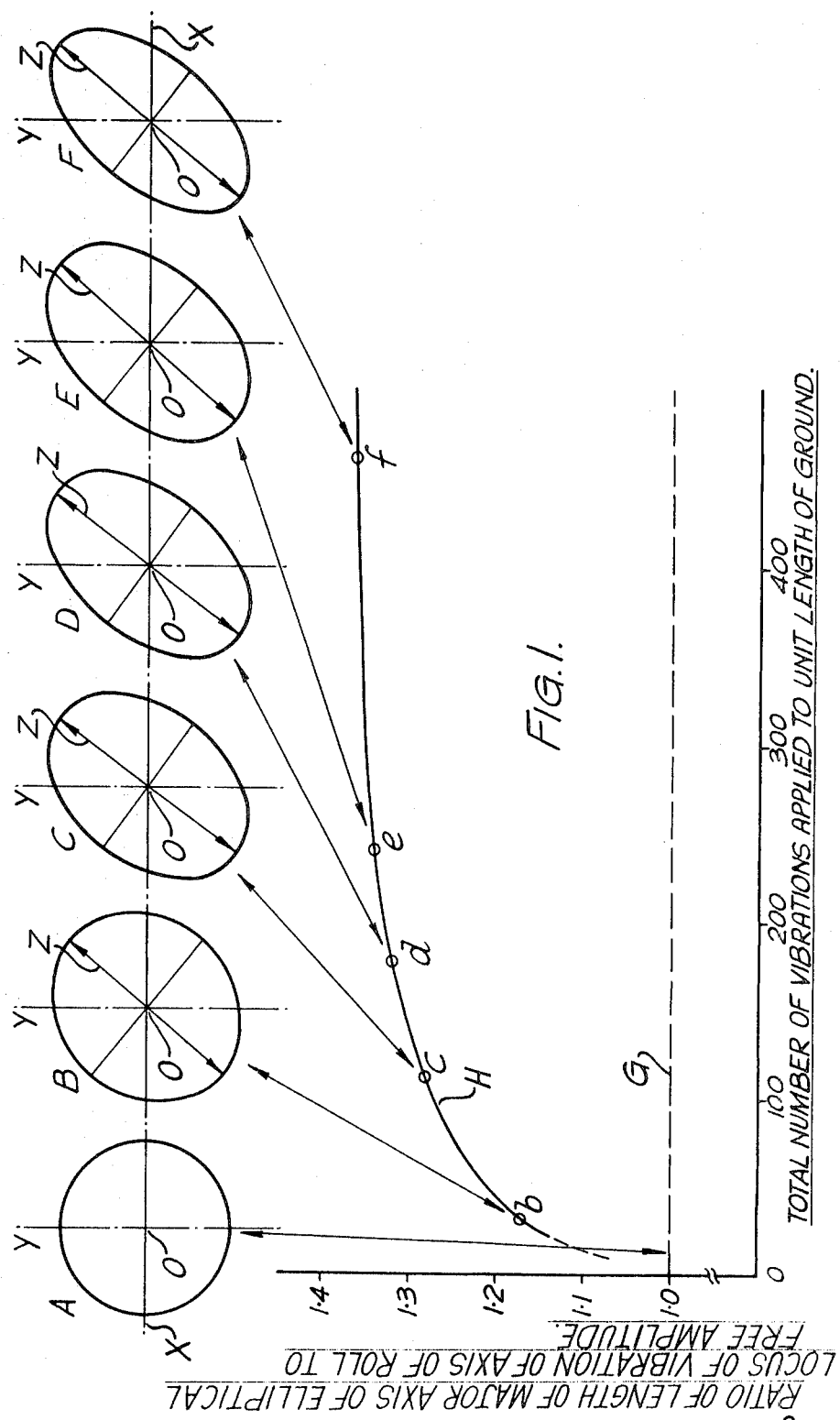
Figure 2:
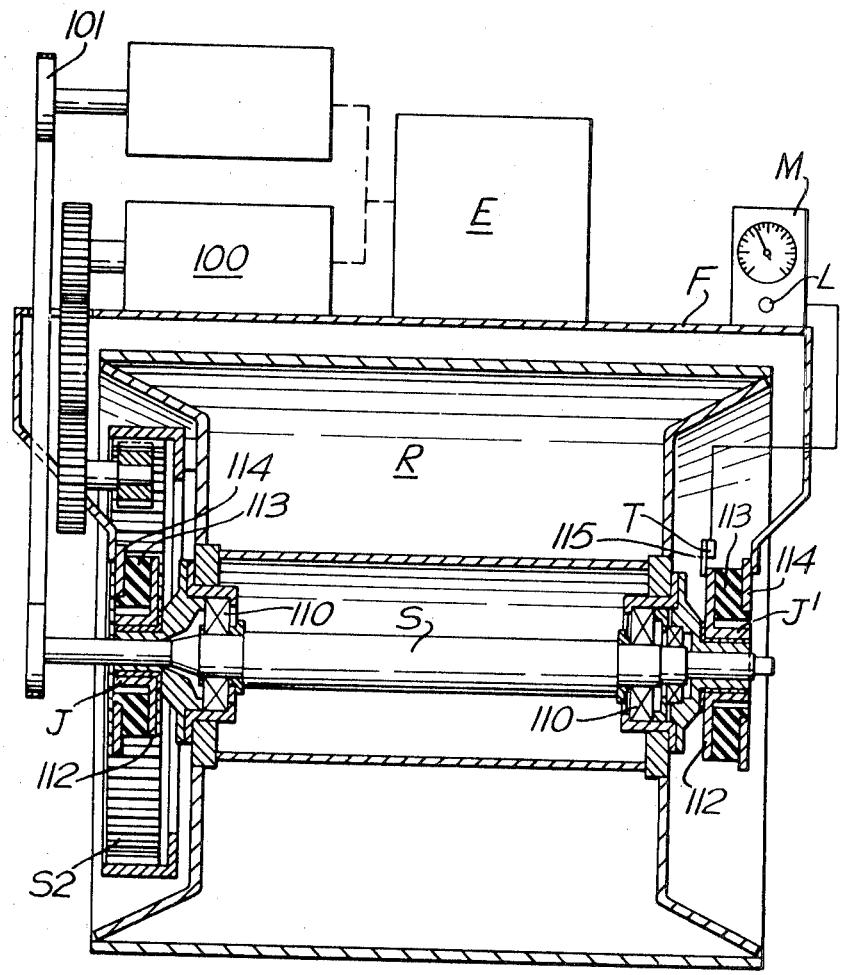
FIG. 2 is a diagrammatic vertical cross section of a vibrating roller equipped to implement the method of the invention.

Referring to FIG. 1 of the drawings, and considering a vibrating roller subjected to a rotating out of balance force of constant amplitude and frequency, the path followed by a point on the axis of the roll when the latter is freely suspended on its mountings out of contact with the ground (corresponding to the theoretical condition under which the density of the soil being compacted is negligible) is represented by the figure A which is in the form of a circle which will be considered as having unit diameter. This value is represented by broken line G on the graph. When the roller is applied to ground to be compacted, the degree of compaction of the latter will rise in accordance with the total number of vibrations applied to a unit length of ground (this is a convenient method of expressing the amount of vibration applied; it may be achieved either by a large number of passes of the machine over a given area of ground at a high speed, or a lower number of passes at a lower speed), and as explained above, a point on the roll will follow a path in the form of an ellipse as a result of the vibrationary excitement of the roll. The actual path followed by the points away from the axis of the roll will be modified by the rotation of the latter. The applicant has found the length of the major axis of this path to be a very accurate measure of the degree of compaction achieved. The increase in length of this major axis, as compared with the diameter of the circular locus of vibration obtained with the roll freely suspended on its mountings (line G), is shown by curve H. The actual shape of the locus at various points on the curve $b$, $c$, $d$, $e$, $f$, is illustrated by the figures B, C, D, E, F, the major axis in each case being indicated by the letter Z. It should be noted that the tilting of the ellipse (due to change in phase angle) may alter during compaction or on different types of soil, while the tilt is usually forwards relative to the direction of rotation of the vibrating member, it can be in a rearward direction. There are noted angles of tilt varying from 48° forwards to 20° rearwards, a total range of 68°, though normally soils in a suitable condition for compaction exhibit a smaller range of some 46°.

It will be seen from FIG. 1 that as the degree of compaction of the ground increases responsive to the increasing number of vibrations applied per unit length, so does the length of the major axis Z of the elliptical path. This length is thus a measure of the degree of compaction achieved. This alteration in the number of vibrations applied may be achieved either by altering the number of passes made by the roller or by altering its travelling speed.

FIGS. 2—5 and 7 illustrate a vibratory roller equipped to make measurements of characteristics of the vibratory movement of the roll whereby the length of the major axis of the elliptical path may be assessed and translated into a signal indicative of the degree of compaction achieved.

A roll R is mounted in a frame F by means of bearings J and J', having flanges 112 mounted to flanges 114 attached to the frame through rubber-in-shear mountings 113. An out of balance shaft S is mounted in bearings 110 for rotation on the axis of the roll and is driven through a pulley drive 101 by a motor E. The roll itself is also driven for roller traction purposes by motor E through a variable speed transmission system 100 and gear ring S2.

The flange 112 at one end of the roll carries a bracket or brackets 115 on each of which is mounted a transducer unit generally indicated by the letter T.

Figure 4:
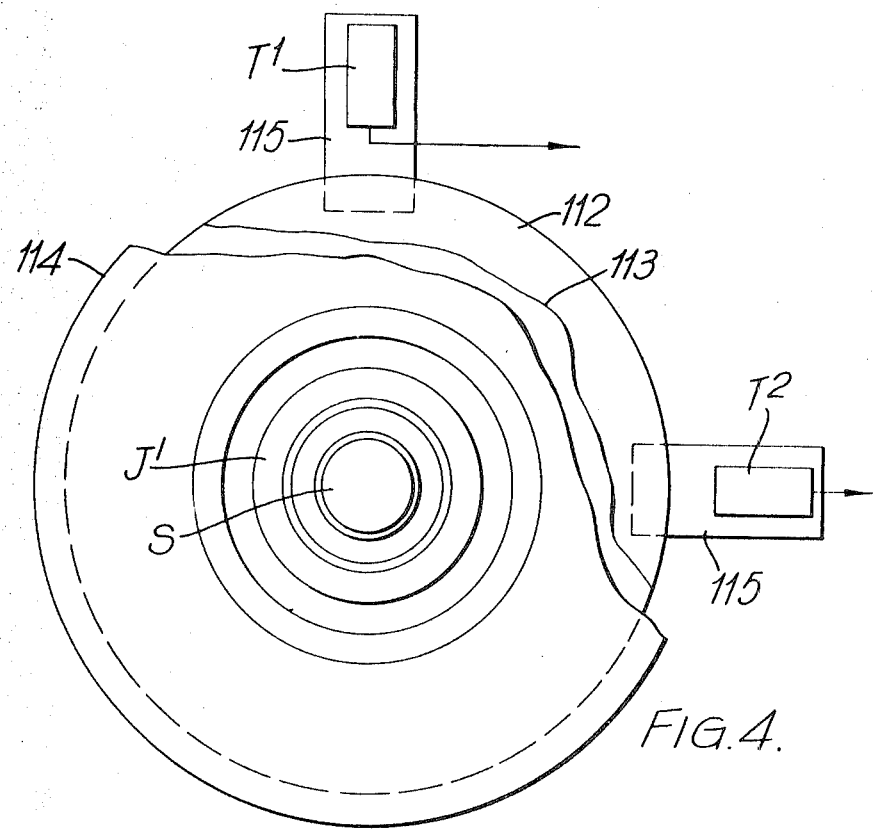
FIGS 4, 5 and 7 are details showing alternative arrangements of transducer on the roll suitable for implementing the invention.
Figure 5:
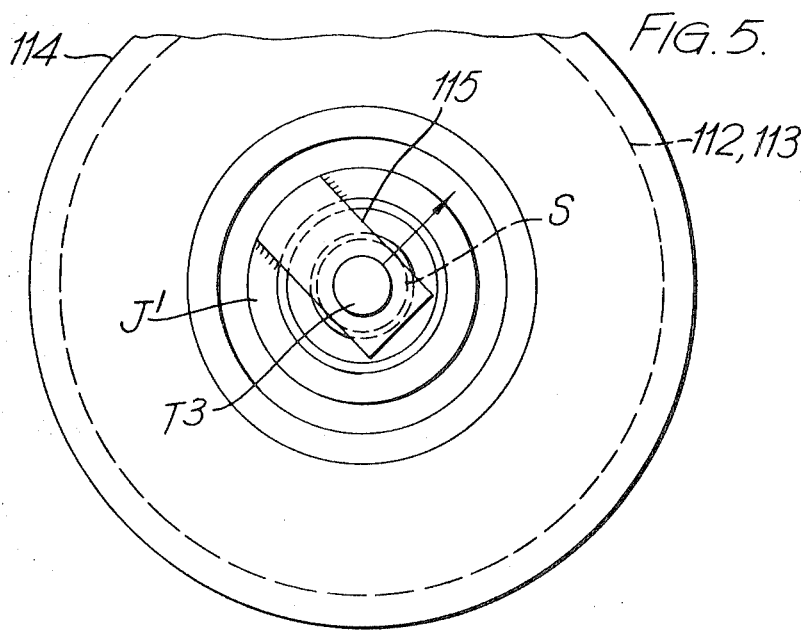
Figure 7:
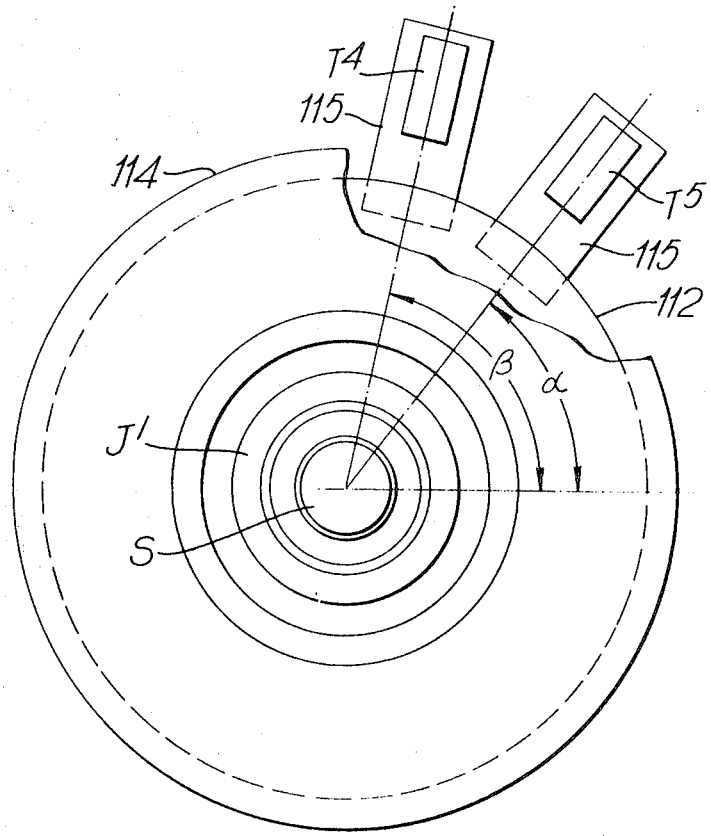

Three alternative transducer arrangements are shown in FIGS. 4, 5 and 7.

It will be understood from a study of the various paths illustrated in FIG. 1 that the length of the major axis of the various ellipses may be determined from measurements indicative of the length of two perpendicular axes of the elliptical path, such as axes X and Y, or by a measurement of a value indicative of the actual maximum displacement of the point whose path is being studied from its rest position O, this corresponding to the half length of the axis Z.

In FIG. 4, the units T comprise two piezoelectric accelerometers $T^1$, $T^2$ responsive to acceleration on mutually perpendicular axes of the outputs from which are passed to a computer unit N (see FIG. 6) in which they are integrated and combined to provide a resultant signal indicative of the length of the major axis of the path followed by the mounting of the transducers as a result of the vibration transmitted to the brackets 115 which move in accordance with the vibratory movement of the roll axis. Both accelerometers will move in a path such as shown by the ellipses B-F in FIG. 1. This movement can be analyzed into a vertical displacement component and a horizontal displacement component. Any suitable arrangement of computer unit which is capable of isolating and indicating a value proportional to the maximum instantaneous displacement of vibration of a vibrated part of the roller from the output of the transducers $T^1$, $T^2$ may be used. The brackets 115 carrying the transducers are arranged so that the sensing axes of the accelerometers are radial with respect to the roll axis. This ensures that the accelerometers do not respond to torsional oscillations in the roll suspension which might otherwise falsify the readings obtained.

FIG. 5 shows an arrangement in which the transducers $T^1$, $T^2$ are replaced by a single omnidirectional transducer $T^3$ situated on the axis of the roll so as to avoid interference due to torsional oscillations in the roll suspension. Since only the length of the major axis of the elliptical vibration path need be known, a transducer giving an output which at any moment is proportional to its instantaneous displacement from a rest position (or an output which can be integrated to give such an output) is all that is required. As in the arrangement of FIG. 4, a signal corresponding to the maximum amplitude of displacement is isolated from the transducer output and applied to the meter M (see FIG. 2).

It should be understood that the word 'omnidirectional' in the foregoing description is taken to mean responsive to motion in any direction in a plane perpendicular to the axis of the roll R.

Additionally, an indicator L is provided which may be in the form of a light adapted to come on or go off at a preset value of signal corresponding to a certain degree of compaction. This value may be preset by the operator in conjunction with the meter.

In a further development, the signal is used to control automatically the speed of the roller, an increase in the signal beyond a certain point operating control means P (see FIG. 6) to cause an increase in the travelling speed of the roller, thus reducing the amount of vibration applied to the ground during a single pass of the roller, and vice versa.

Figure 6:
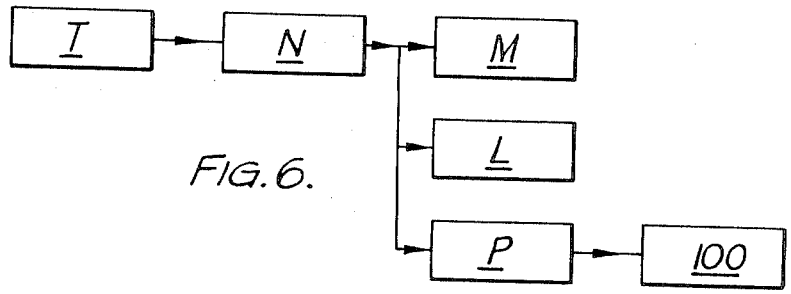
FIG. 6 is a block diagram showing the relationship of those parts of the roller characteristic of the invention.
Figure 3:
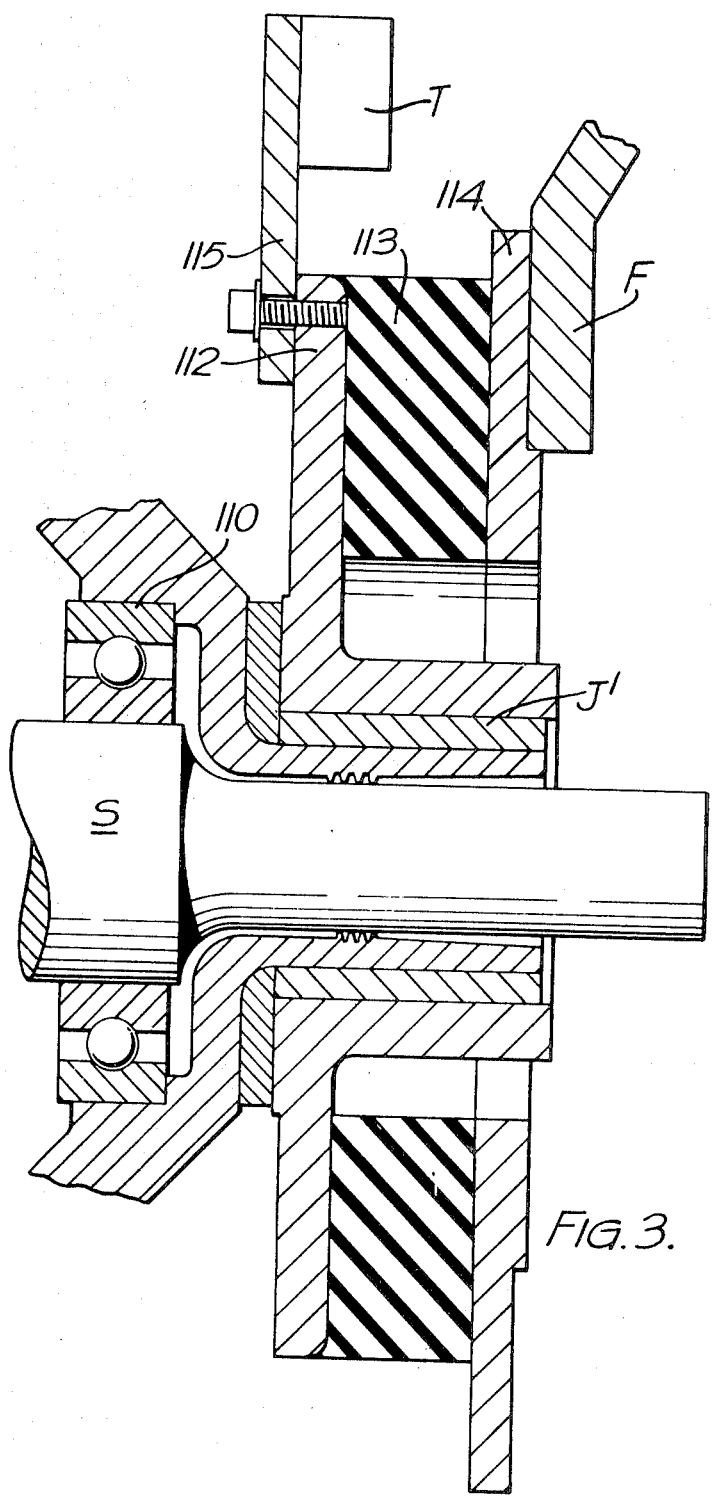
FIG. 3 is a detail of the apparatus shown in FIG. 2.

The relationship between the various portions of the roller characteristic of the invention is shown in the block diagram of FIG. 6. The transducer unit T passes its output to the computer unit N, which isolates from the transducer output a signal proportional to the maximum vibrationary displacement of the roll axis which is in turn proportional to the major axis of the elliptical path of a point on a vibrating part of the roller and is indicative of the degree of compaction achieved. This signal may be fed to a meter M, giving a direct reading of the degree of compaction achieved and possibly in addition to an indicator L which indicates when a desired degree of compaction has been achieved and/or to control means P which acts on the transmission 100 to change the speed of the roller in response to the signal reaching a predetermined level.

The embodiments described with reference to FIGS. 4 and 5, although based on mathematically correct principles, have certain disadvantages which in practice limit the accuracy of the results obtained. In a vibrating roller, the roll R is subjected to a number of forces other than those directly applied by the out of balance shaft S. Such forces include movement of the roll R on its suspension due to ground irregularities, especially those due to lumps of rock or the like, and harmonics of the fundamental vibration frequency caused by interaction of the roll with the ground. These forces cause accelerations of the roll to which the transducer assembly T can respond.

Where T comprises an omnidirectional transducer $T^3$ FIG. 5, it follows that all those additional accelerations which occur in the plane of the locus will cause the transducer to emit spurious signals, whilst the transducer will in effect record vibrations in radial acceleration relative to the center of the path, which will be small relative to the maximum radial acceleration. It is found that the spurious signals assume such a magnitude relative to the required signal that this cannot be recovered from the transducer output without considerable loss of accuracy.

Where two transducers $T^1$, $T^2$ are used, it is necessary after processing the transducer outputs (in practice filtering to remove as far as possible spurious signals, and integrating twice to obtain a signal proportional to displacement rather than acceleration) to combine the signals to obtain the result signal proportional to the instantaneous displacement of the roll axis which involves squaring the signals, summing them, and taking the square root of the sum. Whilst electronic equipment capable of carrying out these operations is well known, the resulting apparatus is expensive and considerable inaccuracies can arise both due to the fact that inaccuracies resulting from spurious signals in the two channels are combined, and due to the number of stages of processing involved.

I have found with these methods that the degree of compaction achieved can, with economically feasible equipment, be measured with an accuracy of about 10 percent, and whilst this does not compare particularly unfavorably with known methods (except where the mean of a large number of readings is taken) of measuring compaction (which known methods cannot of course be carried out actually during compaction, and are in addition tedious and time consuming), a higher degree of accuracy would be highly desirable, in view of the fact (see FIG. 1) that whilst compaction proceeds rapidly during the initial stages of treatment, the rate of compaction drops considerably in the later stages, making a sensitive measurement important if uniform compaction is to be achieved.

In a preferred embodiment of the invention, therefore, the transducer arrangement shown in FIG. 7 is employed, wherein two transducers $T^4$, $T^5$, in practice unidirectional piezoelectric accelerometers, are arranged radially with respect to the roll axis and at a relatively narrow angle to each other. It has been described above how the inclination of the elliptical path of a point on the roll may vary (according to my own experiments) through an angle of 68°, and more usually 46°. It will also be clear from FIG. 1 that the amplitude of the elliptical path will be substantially constant for an appreciable angle to either side of the major axis, the extent of this angle depending on the length of the minor axis of the ellipse. In fact the range of inclinations I have observed is between 42° and 110° clockwise from the horizontal where the direction of rotation of the shaft S is anticlockwise, whilst the range observed on soils in a fit condition for compaction is between 42° and 88° from the horizontal. The average of these angles is 65°, and it can be shown that if the two accelerometers are placed at angles $\alpha=52\frac{1}{2}°$ and $\beta=77\frac{1}{2}°$ to the horizontal respectively, the output from that accelerometer giving the larger output will not differ from that which would be given actually on the major axis by more than 1.8 percent under the worst conditions. In actual practice no discrepancy has been observed at all within the limits of accuracy of the observations made i.e. ±½ percent. It should be appreciated that these observations have been made on a limited number of rollers, and experiment with other rollers may dictate somewhat different positioning of the transducers: however, the principles involved remain the same. Moreover, if the roller characteristics or the degree of accuracy required dictated it, more than two transducers might be used, or in some cases it might be possible to use only one transducer placed at an appropriate angle if experience showed the variation of inclination of the elliptical path under the working conditions encountered to be small. Generally however I believe that two transducers will be appropriate.

The signals from the two transducers are processed independently, and the larger signal thus obtained selected to give the amplitude of the major axis of the elliptical path. Since this signal is derived from the output of only one unidirectional transducer, not only is the input of spurious signals much reduced, but inaccuracies due to summing of the errors of two channels and to the operations required to combine them are eliminated. In practice, using the signal processing stages described below with reference to FIGS. 8 and 9, the results obtained appear to be accurate to within the accuracy to which the meter M can be read (about ½ percent).

Figure 8:
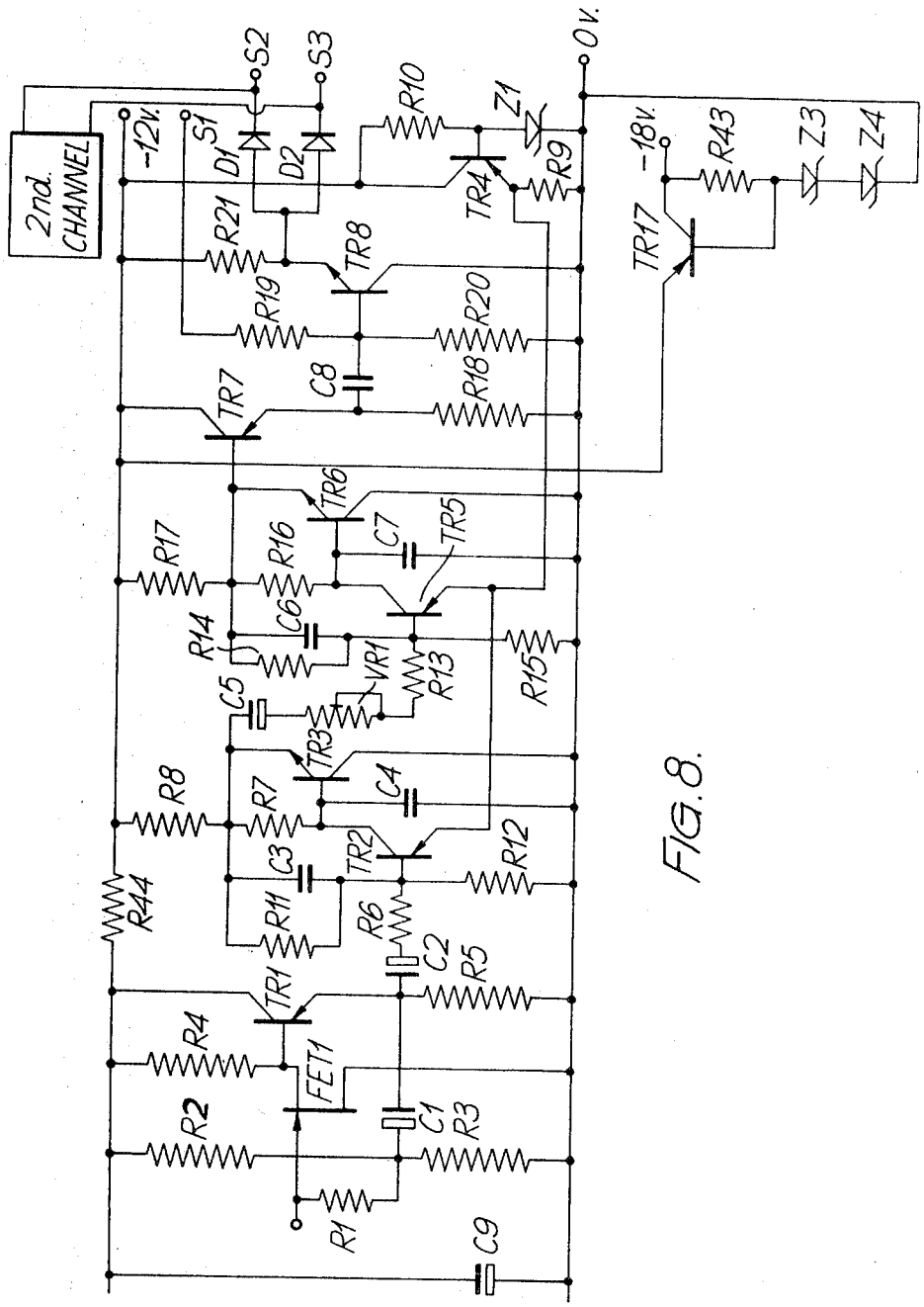
FIG. 8 is a circuit diagram of a computer unit suitable for use with the transducer arrangement of FIG. 7.

Referring now to FIGS. 8 and 9, these show the circuit of (FIG. 8) a computer device operative to process in separate channels the outputs of the transducers $T^4$, $T^5$ and to provide an output signal proportional to the amplitude of the major axis of the locus of vibration of the roll R, and (FIG. 9) a display device operative to show the degree of compaction both on a meter M and by means of a light L energized on a predetermined level of compaction having been achieved. In practice, one or other of the meter M and the light L would be provided, preferably the meter, and the circuitry solely associated with whichever of these two means was not adopted would be omitted. In FIG. 8, only one processing channel has been shown in detail since the two channels are identical. In the event of more than two transducers being used, additional channels would be added.

As stated above, the transducers $T^4$, $T^5$ are piezoelectric accelerometers, and have the high output impedance characteristic of such devices; the output of each accelerometer is thus applied to a source follower amplifier comprising the field effect transistor FET1, the gate of which is biased through a high value resistance R1, by a potential divider R2, R3. The source of FET1 is fed through R4 which also biases a emitter follower stage, comprising transistor TR, and emitter resistance R5, direct coupled to the source of FET1. A high value capacitor C1 connects the emitter to TR1 to the junction of R2, R3 thus increasing the effective input impedance of the circuit by maintaining this junction by substantially the same potential as the gate of FET1.

The relatively low-impedance output at the emitter of TR1 is coupled via capacitor C2 to the input resistance R6 of a first integrator centered around TR2 and TR3, the integrating capacitor C3 being connected between the base of TR2 and a junction between resistances R7, R8 forming its collector load. TR2 and TR5 (see below) are emitter biased by means of a stabilized supply feeding into resistance R9, the stabilized supply being provided from the emitter of transistor TR4 whose base voltage is set by a zener diode Z1 biased into breakdown through resistance R10.

TR2 is also base biased through the high-value resistors R11, R12, R11 also providing a negative feedback path from the aforesaid junction between R7 and R8. The effect of this negative feedback path is to make the integrating capacitor C3 'leaky' and thus to smooth out variations in its degree of charge due to low frequency disturbances or intermittent disturbances. The feedback is frequency selective due to the time constant of the C3/R11 combination with the result that it will only be effective on components of the input signal whose frequency is such that the reactance of the capacitor C3 is significant compared to the resistance of R11. The value of R11 is chosen so that its resistance is large compared to the reactance of C3 at the frequency of vibratory excitation of the roll. A capacitor C4 connected between the collector of TR2 and ground is selected so as to provide a low impedance to high frequency disturbances which may be superimposed on the desired output from the transducer.

Thus as well as carrying out integration of the desired signal, the circuit also acts as a filter to reduce spurious signals. The capacitive coupling of the signal into the stage by C2 blocks any DC and very low frequency components of the signal, but more important, in conjunction with resistances R11, R12 it maintains the mean level of charge on C3.

The silicon transistor TR3, which is of opposite polarity to TR2, is connected with its base/emitter junction between the collector of TR2 and the junction of R7 and R8, and its base/collector junction is connected between the collector of TR2 and ground, R8 acts as the collector load proper of TR2 and the emitter load of TR3, while R7 acts to provide bias for TR3, which thus as an emitter follower to reduce the effective output impedance of TR2.

The emitter of TR3 is coupled by capacitor C5 to a further integrator circuit comprising transistors TR5, TR6, resistances R13-R17, capacitors C6, C7, and variable resistance VR1. The circuit is identical to that of the integrator already described, except that the input resistance instead of being fixed includes VR1, by which the gain of the circuit may be varied by altering the time constant of the combination (R13+VR1). C6.

The double integration carried out in the two integrator circuits has as its primary purpose the production from the transducer output (which is proportional to the acceleration of the roll on a particular axis) of a signal proportional to the displacement of the roll due to its vibratory excitation. In practice this entails substantial removal of the harmonics from the signal leaving a substantially sinusoidal waveform at the fundamental frequency of excitation of the roll, and this could be achieved by alternative circuitry other than integrators: nevertheless, the effect in the present case would be equivalent to integration and I thus regard such circuitry for the purpose of the present invention as falling within the term integrator.

The Miller integrator actually adopted is however particularly suitable as it is simple and lends itself ideally to the carrying out of various other operations on the signal for example the elimination of high and very low frequency interference as already described, and further to compensation for variations in the frequency, and hence amplitude, of excitation of the roll. In practice it is not possible to maintain the frequency of excitation of a vibrating machine entirely constant for various reasons; in the case of a vibrating roller in which the shaft S is driven by an internal combustion engine, the speed of the engine will very over a small range due to imperfect governing, and a varying degree of slippage may occur in the transmission system. Over a small range of variation, the amplitude of excitation of the roller will vary as the square of the exciting frequency, i.e. at a rate equivalent to 6db./octave. However, the gain of each integrator circuit will itself inherently suffer a rolloff of 3db./octave with increasing frequency and hence the two circuits together will automatically exactly compensate for variations in vibration frequency. Harmonics present in the input signal will of course be attenuated by a factor equal to the square of the order of the harmonic, and extraneous cyclic disturbances will be attenuated proportionately.

The output of the second integrator circuit is subjected to current amplification in an emitter follower stage comprising transistor TR7, which is of opposite polarity to TR6, and resistance R18, and is applied via capacitor C8 to a further emitter follower centered around transistor TR8. The base of TR8 is biased by a potential divider consisting of resistances R19 and R20, supplied from a voltage stabilized source via connection S1 (see below); this sets a reference level about which the output at the emitter of TR8 alternates, R21 being the emitter load. Outputs are taken from the emitter of TR8 to connections S2, S3 via diodes D1, D2, as are similar outputs from an identical channel shown in block form and receiving its input from transducer T5. The pairs of diodes thus associated with each connection S2, S3 form OR gates permitting transmission only of the greater of the two signals from the independent channels.

A stabilized power supply for the entire computing and display assembly shown in FIGS. 8 and 9 is provided by a first series regulator comprising transistor TR17 whose base is biased through resistance R43 to a reference voltage set by zener diodes Z3, BRIEF DESCRIPTION OF THE DRAWINGS TR1, TR2 are supplied through R44, their supply being decoupled by capacitor C9.

Referring now to FIG. 9, a second series regulator supplied from the first series regulator comprises transistor TR18 whose base is biased through resistance R45 to a reference voltage set by zener diodes Z5, Z6, and this regulator feeds a potential divider network consisting of resistance R46, variable resistance VR3, and resistance R47, the potential developed across R47 setting the bias on transistor TR19. A diode D5 inserted in series with R47 provides a degree of temperature stabilization and capacitor C19 decouples the bias supply. In conjunction with its emitter load resistance R48, TR19 thus provides a regulated reference voltage at its emitter which may be set by VR3.

Between the emitter of TR19 and connection S2 are connected, in series, a variable resistance VR4 and a microammeter forming the meter M, a diode D6 bypassing reverse potentials induced in or applied to the meter. VR4 is used to set the sensitivity of the meter, whilst VR1 is used to set the signal level at which the diode D1 or its counterpart in the second channel starts to conduct. These diodes thus fulfill a rectifying, as well as a selecting function due to one diode of the pair being reverse biased as soon as the other starts to conduct. A capacitor C20 smooths the AC component of the rectified current passed by whichever diode conducts, and also damps any transient spurious signals which may manage to pass through the integrator stages. The time constant of this capacitor in combination with the meter and VR4 is selected to be very long compared with periodicity of the unrectified signal so that the meter reading is proportional to the peak amplitude of the signal and hence the maximum instantaneous amplitude. Thus the zero point of the meter M may be set to represent any desired minimum degree of compaction, and its full scale deflection to represent any desired range of compaction, the scale being calibrated accordingly. The meter reading is not detectably affected by spurious signals that may be picked up by the transducer, these being filtered out in the integration stages or blocked by the AC coupling at various points in the circuit.

The output from the diode D2 or its counterpart in the second channel is smoothed by capacitor C21, which serves a similar purpose to C20, and is applied to a two stage current amplifier comprising direct coupled transistors TR20 and TR21 having opposite polarities and each connected in emitter follower configuration and suitably biased by means of resistances R49-R52, and variable resistance VR5. The output of the amplifier at the emitter of TR21 is applied to the base of TR22 forming a component of a two stage differential amplifier employing matched pairs of transistors TR22, TR23, and TR24, TR25 of opposite polarity in conventional long tailed pair circuits involving resistances R53-R58. Temperature stabilization is provided by TR26 in series with R58 in the emitter circuits of TR22 and TR23, the bias of TR26 being set by R59 in series with a diode D7, R59 forming part of a potential divider chain completed by R60 and fed from series regulator transistor TR18.

The presence of a large value capacitor C22 ensures that any residual AC component in the output of the amplifier comprising TR20 and TR21 is applied to the base of TR23 as well as that of TR22 and is therefore cancelled in the differential amplifier, whilst the bias applied to the base of TR23 is set by a potentiometer VR6 in a further potential divider chain fed from TR18. This chain also includes variable resistance VR7 and potentiometer VR8, VR8 being used to set the reference voltage applied to R19 via connection S1.

The potential at the collector of TR25 is applied via a diode D8 to the base of the first transistor TR27 of a Darlington connected pair TR27, TR28 in series with the signal lamp L. The diode D8 remains reverse biased until the negative potential at the collector of TR25 rises above that at the base of TR27, while the network consisting of resistance R61 and capacitor C23 delays response of TR27 and prevents flickering of the lamp under threshold conditions.

The setting of VR6 determines the signal level applied at S3 which will cause the lamp L to turn on, and VR6 is provided with a calibrated knob by which a predetermined signal level may be set. Since the knob is calibrated in terms of compaction, VR5 and VR7 are used to set the spread and displacement of the scale to a desired level during calibration.

A convenient manner of calibrating the scale of the meter M or the potentiometer VR6 is in terms of the ratio between the length of the major axis of the elliptical path and the diameter of this locus when the roll is permitted to vibrate freely, i.e. is jacked up off the ground, the scale in both case being linear and graduated so as to give indication from below a 1:1 ratio up to at least the maximum ratio encountered in practice. The various variable resistances in the display unit are adjusted during manufacture of the combined unit so that the scale readings of meter and potentiometer 6 are exactly proportional to the amplitude of an AC signal applied at the output of the second integrator(s), and when the unit is fitted to a roller, it is only necessary to jack the latter up so that the roll may vibrate freely and to adjust VR1 and its counterpart in the second channel so that the meter M reads 1.0 or the lamp L just comes on when the potentiometer is set to a 1.0 gradation. In practice I believe that a scale graduated between 0.98 (i.e. just below 1.0) and 2.2 will be suitable in many instances but it may be found that more or less extended scales are required for different types of roller.

In analogous embodiments, the invention is applied to vibratory earth compacting pads, or a beam such as is used in the consolidation of freshly placed concrete. Hitherto it has been difficult to obtain consistent results from such machines, particularly when they are operated by relatively unskilled labor, since there is no simple and immediate method of knowing when the require degree of consolidation has been obtained.

A vibratory compactor having a pad or shoe as the vibratory element by which vibration is imparted to the ground being compacted, may be excited by a rotating out of balance weight in the same manner as a vibratory roller, and in this case apparatus substantially identical to that already described in connection with a vibratory roller may be used, the transducer assembly being mounted on the shoe or pad instead of the roll. In the case of some other compacting machines where vibration is applied to the surface of a material being compacted it may be found that variation in the direction of the major axis of the elliptical vibration path is small or nonexistent, in which case only a single-unidirectional transducer need be used.

In all the embodiments described it will be noted that acceleration transducers have been utilized to provide the signals employed for processing, thus requiring stages of integration to obtain a second signal proportional to the maximum instantaneous amplitude. While it might at first sight appear preferable to utilize velocity or displacement transducers (though it may be observed that many of these are in fact acceleration transducers arranged to give an integrated output), and I do not disclaim such use, I prefer the use of piezoelectric acceleration transducers since the latter are robust, readily available, and easily mounted at any convenient point on the vibrating member of the machine concerned, and the integration required permits suppression of interference and compensation for vibrator frequency variations, as previously described. Further advantages of piezoelectric accelerometers are that their response is both high, directional and falls off rapidly at low frequencies substantially below the at which the vibrated member is excited, so that normal relatively slow suspension movement causes little or no signal.

It will also be noted that the apparatus of the invention m. readily be fitted to an existing machine, since it is only necessary to mount the transducer or transducers in an appropriate orientation on the vibrating member of the machine, and to connect them to a box containing the computing and display means, which may be powered either by self contained batteries or the electrical system (if provided) of the machine. Obviously more complex connections will be required if the apparatus is to control directly the speed of movement of the machine over the ground. For this purpose a relay control change speed actuator P may be substituted for the lamp L.

I claim:

1. A method of determining the degree of compaction imparted to a material by the application to the surface thereof by a vibratory member, said method comprising providing a reference device for indicating the increasing degree of compaction attained during compaction of the material; generating a vibrating force of substantially constant frequency and magnitude by rotation of an out of balance weight, said frequency being at all times greater than the resonant frequency of the material; subjecting said vibratory member to said vibrating force whereby movement of said vibratory member caused by said vibrating force follows an elliptical path; generating a signal in response to said movement of said vibratory member and at all times substantially proportional to the length of the major axis of said elliptical path, the generating of said signal comprising making continuous measurements of the instantaneous acceleration of said vibratory member by sensing said instantaneous acceleration separately on at least two axes in the region in which the actual axis of which the major axis of the elliptical path lies is located, said sensing axes being spaced within said region relatively to said actual axis so that at least one of said sensing axes will be sufficiently close to said actual axis for the instantaneous amplitude of vibration on said one of said sensing axes not to differ substantially from the maximum instantaneous amplitude of vibration, the measurements on each of said sensing axes being separately integrated twice against time and the largest output resulting from said integration providing a signal of which the maximum amplitude is substantially proportional to the length of said major axis; and utilizing said signal to cause said reference device to indicate the degree of compaction achieved.

2. In a vibratory roller machine, a frame; a vibratory ground contactable roll journaled in said frame and being adapted to be placed against the surface of material to be compacted; a rotating out of balance weight journaled within said vibratory roll to apply thereto a vibratory exciting force of substantially constant amplitude and frequency for causing said vibratory roll to follow an elliptical path in moving in response to said exciting force; transducer means comprising two accelerometers responsive to acceleration of the vibratory roll on two mutually perpendicular axes perpendicular to and intersecting the axis of the vibratory roll, said transducer means being operable in accordance with vibration of said vibratory roll and being sensitive to a function of the instantaneous amplitude of the elliptical path of vibration of said roll due to vibration of said vibratory roll from a rest position; means for isolating from the output of said transducer means a first signal substantially directly proportional to the length of the major axis of the elliptical path followed by said vibratory roll in response to said exciting force; and means continuously receiving said first signal and being responsive thereto to transmit a second signal useful for control purposes at least one value of said first signal.

3. In a vibratory machine, a vibratory part adapted to be placed against the surface of material to be compacted; a rotating out of balance weight journaled in said part to apply thereto a vibratory exciting force of substantially constant magnitude and frequency for causing said vibratory part to follow an elliptical path in moving in response to said exciting force; transducer means operable in accordance with vibration of said vibratory part and being sensitive to at least one characteristic of said vibration, said at least one characteristic being a function of the instantaneous displacement of said vibratory part due to vibration of said vibratory part from a rest position; means for isolating from the output of said transducer means a first signal substantially directly proportional to the length of the major axis of the elliptical path followed by said vibratory part in response to said exciting force; and means continuously receiving said first signal and being responsive thereto to transmit a second signal useful for control purposes at least one value of said firs signal, the transducer means comprising a plurality of accelerometers mounted on the vibratory part and being responsive to acceleration of the vibratory part on different axes disposed relative to the range of axes on which the maximum instantaneous displacement of said vibratory part occurs, whereby at least one transducer will always be situated on the axis sufficiently close to the actual axis of the maximum instantaneous displacement for the instantaneous displacement on the axis of said at least one transducer to be substantially equal to the maximum instantaneous displacement, said isolating means comprising means for receiving the output signals of said transducers and for integrating them twice against time, and means operative to select the largest of said integrated signals to provide said first signal.

4. In a vibratory roller machine, a frame; a vibratory ground contactable roll journaled in said frame and being adapted to be placed against the surface of material to be compacted; a rotating out of balance weight journaled within said vibratory roll to apply thereto a vibratory exciting force of substantially constant magnitude and frequency for causing said vibratory roll to follow an elliptical path in moving in response to said exciting force; transducer means operable in accordance with vibration of said vibratory roll and being sensitive to a function of the instantaneous amplitude of the elliptical path of vibration of said roll due to vibration of said vibratory roll from a rest position; means for isolating from the output of said transducer means a first signal substantially directly proportional to the length of the major axis of the elliptical path followed by said vibratory roll in response to said exciting force; and means continuously receiving said first signal and being responsive thereto to transmit a second signal useful for control purposes at least one value of said first signal, the transducer means comprising a plurality of accelerometers mounted on said roll and being responsive to acceleration of said roll on different axes disposed relative to the range of axes on which the maximum value of said first signal is generated, whereby at least one transducer will always be situated on an axis sufficiently close to the actual axis on which said maximum signal is generated for the displacement on the axis of that transducer to be substantially equal to the maximum instantaneous displacement, and wherein said isolation means comprises means for receiving the output signals of said transducers and for integrating them twice against time, and means operative to select the largest of said integrated signals to provide said first signal.

5. The vibratory machine of claim 4, wherein said accelerometers are mounted with their axes of response radial with respect to the axis of the roll.

6. The vibratory machine of claim 4, wherein said transducers are two in number, are mounted on the roll so as to respond on axes separated by approximately 25° and are symmetrically placed relative to the center of the range of axes assumed by the axis of the maximum instantaneous displacement of said roll.

7. The vibratory machine of claim 3, wherein the accelerometers are piezoelectric accelerometers, the output of each accelerometer being applied to an integrating channel comprising in succession a buffer amplifier, two AC coupled stages of integrating amplification, and a further buffer amplifier, the outputs of the integrating channels being applied to an OR gate biased to have a selecting and rectifying function, the output of the gate being smoothed and applied to a meter.

8. The vibratory machine of claim 4, including a signal lamp, and wherein said accelerometers are piezoelectric accelerometers, the output of each accelerometer being applied to an integrating channel comprising in succession a buffer amplifier, two AC coupled stages of integrating amplification, and a further buffer amplifier, the outputs of the integrating channels being applied to an OR gate biased to have a selecting and rectifying function, the output of the gate being smoothed and applied to a circuit adapted to switch on said signal lamp in response to a preset signal level.

9. The combination with a vibratory machine having a member vibrationally excited by a rotating out of balance weight and being adapted to be placed against the surface of material to be compacted, of a compaction indicator comprising a plurality of unidirectional accelerometers mounted on the vibrationally excited member on angularly spaced axes within the range of angles assumed by the major axis of the ellipse traced by said member in response to said vibrationary excitement; and a computing and display unit comprising a plurality of integrating channels each receiving the output from one of said accelerometers and each comprising two series connected AC coupled integrating circuits, means to detect the maximum value of the output of that channel producing the largest output of any of said channels, and means to smooth and measure said detected value.

10. The combination according to claim 9, wherein said means to smooth and measure the detected value comprises a meter.

11. The combination according to claim 9, wherein the means to smooth and measure the signal comprises a lamp and a circuit responsive to a preset signal level to illuminate said lamp, the preset signal level being variable against a calibrated scale.